Oct. 7, 1969     J. A. CLARK ET AL     3,471,220
MULTIPLE OBJECTIVE NOSEPIECE MOUNTING
Filed Sept. 28, 1966     2 Sheets-Sheet 1

JAMES A. CLARK
EDWARD N. ESMAY
INVENTORS

BY *Frank C. Parker*

ATTORNEY

Oct. 7, 1969   J. A. CLARK ET AL   3,471,220
MULTIPLE OBJECTIVE NOSEPIECE MOUNTING
Filed Sept. 28, 1966                        2 Sheets-Sheet 2
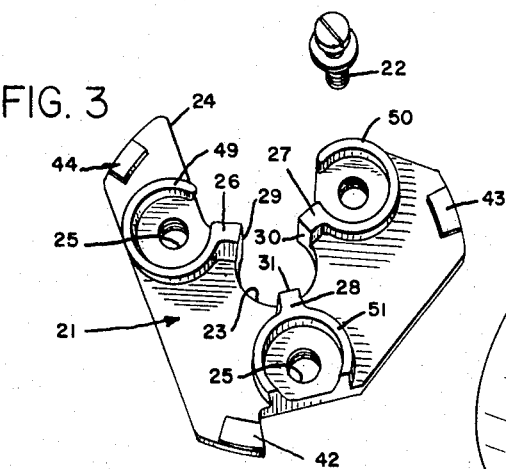
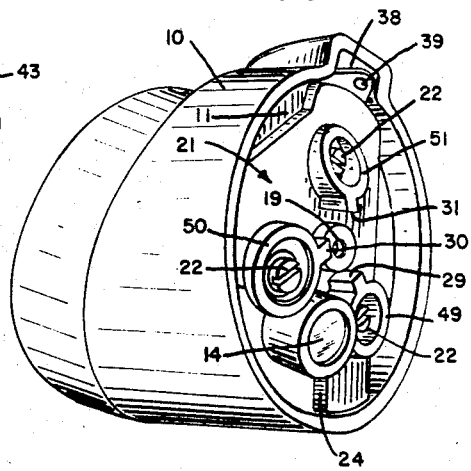
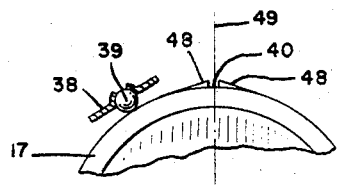
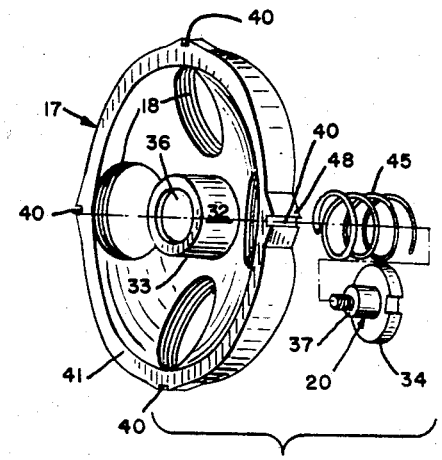
JAMES A. CLARK
EDWARD N. ESMAY
INVENTORS
BY Frank C. Parker
ATTORNEY

United States Patent Office 3,471,220
Patented Oct. 7, 1969

3,471,220
MULTIPLE OBJECTIVE NOSEPIECE MOUNTING
James A. Clark and Edward N. Esmay, Brighton, N.Y., assignors to Bausch & Lomb Incorporated, Rochester, N.Y., a corporation of New York
Filed Sept. 28, 1966, Ser. No. 582,706
Int. Cl. G02b 7/02, 7/04, 15/02
U.S. Cl. 350—254                                5 Claims

ABSTRACT OF THE DISCLOSURE

A multiple objective nosepiece mounting for a microscope is described in which an adjustable bearing plate is positioned between the microscope tube and the nosepiece shell which carries the objectives. Two bearing interfaces, one of which is axial and one of which is radial, exist between the plate and the nosepiece shell for repeatably optically aligning the objectives with the microscope. Both sets of bearing interfaces are yieldably biased against each other. In addition, a cooperating indexing mechanism is included for repeatably locking the nosepiece shell and its objective in optical alignment with the microscope.

---

The present invention relates to a multiple objective nosepiece mounting and it relates more particularly to improvements in the supporting mechanism therefor.

Traditionally, the task of aligning the axis of the shell which carries the several objectives of a multi-objective microscope with the axis of the tube which carries said shell is a difficult or vexing problem if truly accurate alignment is required. The accuracy requirement may be resolved into two main problems which are, (1) the problem of lateral centering of the apertures of the objective carrying shell with the axis of the microscope tube or body, (2) the problem of longitudinally coaxially aligning the axis of each objective successively with the axis of the microscope tube or body.

Chiefly, the characteristics sought in a multiple objective nosepiece are:

accurate and reliable positioning of each objective when in operative position,
sturdy and simple mechanism which is easy to manufacture, low manufacturing cost,
simplicity and ease of servicing operations, and low operating torque for the revolving nosepiece shell.

Although some of the named characteristics have been incorporated in the past into a nosepiece structure, no solution to the problem has been found which provides all of the aforementioned characteristics.

It is an object of the present invention to provide a novel nosepiece support structure for a changeable multi-objective microscope embodying bearing structure which is sturdy and reliable in action and easy to use and service.

A further object is to provide such a device which accurately positions the axis of the active one of the multi-objectives with respect to the microscope optical axis particularly with regard to longitudinal coaxiality and lateral coincidence or centration.

A still further object is to provide such a device which accurately angularly indexes such objectives into active position and involves little effort on the part of the operator, said device furthermore being well adapted to low-cost manufacture.

Figure 1:
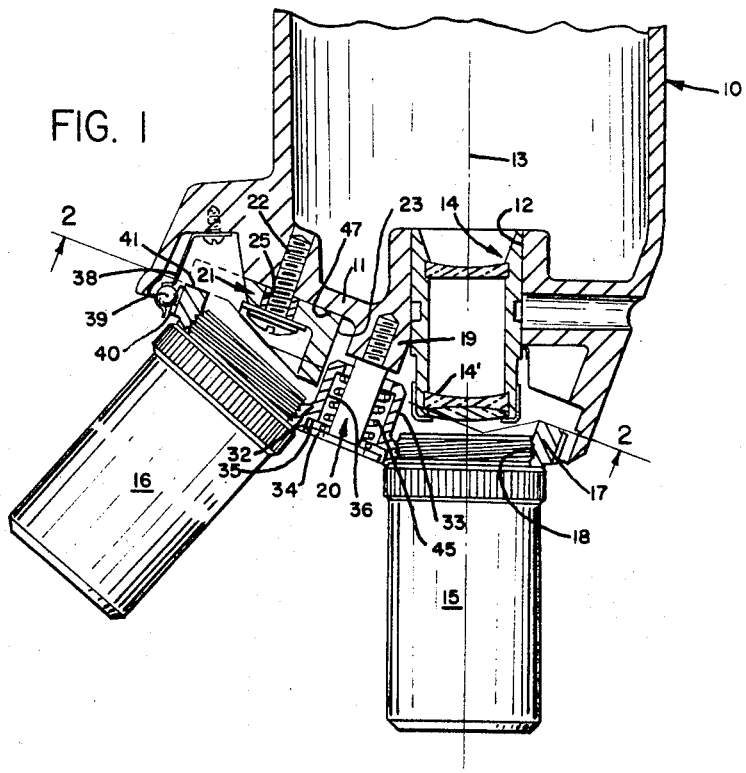
Figure 2:
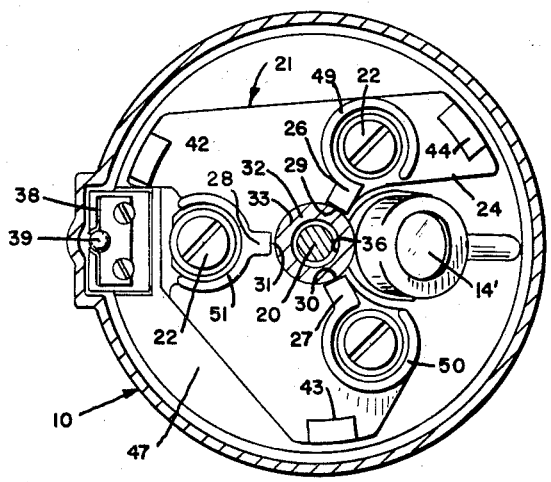

Further objects and advantages will be apparent to those skilled in the art in the combination and arrangement of the parts of said device and in the detailed structures thereof, reference being had to the specification herebelow for a complete description thereof, taken in connection with the accompanying drawings, wherein:

FIG. 1 is a side elevation showing one form of the present invention, parts thereof being broken away and shown in section;
FIG. 2 is a cross-sectional view taken on the line 2—2 of FIG. 1;
FIG. 3 is a perspective view of one of the principal parts per se shown in FIG. 1;
FIG. 4 is a fragmentary sectional view of certain operational parts shown in an operational position;
FIG. 5 is a perspective view of certain assembled parts of said device as they appear in one assembled position; and
FIG. 6 is a perspective view of certain other operational parts of the device shown per se.

The present invention is characterized by a nosepiece bearing structure as described hereinafter which is supported at the lower end of a microscope tube or casing 10 on a cross wall 11 as shown in FIGS. 1 and 5. Formed in said cross wall 11 is a bore 12 located substantially concentrically with the optical axis 13 of the microscope wherein an auxiliary or relay lens cell 14 may be held, if desired. In alignment with said relay lens cell 14 is mounted another fixed lens 14' and an objective 15 along with at least one other objective 16 on a nosepiece shell 17 wherein the objective lenses are held by suitable screw threads 18. Opposite the center of the shell 17 is formed a boss 19 on the cross wall 11 and in said boss a stud 20 is suitable fixed, as shown in FIGS. 1, 5 and 6.

According to the present invention, the objective carrying or nosepiece shell 17 is rotatably mounted primarily by means of an individual bearing plate 21 which is fixed to said cross wall 11 by a plurality of screws, shown at 22 in FIG. 5. In the vicinity of the boss 19, a clearance opening 23 is provided in the plate 21, said opening being intersected by an open-sided recess 24 through which the lens cell 14 freely extends. Each of said screws 22 extends through a corresponding clearance opening 25, FIG. 3, which together with the clearance opening 23 and the peripheral clearance around the plate serve to permit lateral adjustments of the bearing plate 21 so that the objective lens 15 may be optically aligned with the vertical axis 13 accurately.

The cooperative bearing mechanism formed on the plate 21 and shell 17 for the purpose of centering the objective lens 15 with respect to the axis 13 comprises a cluster of three upstanding bosses 26, 27 and 28 which are preferably integrally formed on said plate, said bosses being substantially equally angularly spaced from each other, as shown in FIGS. 2 and 3. Facing inwardly, two flat and mutually inclined bearing surfaces 29 and 30 are formed on the bosses 26, 27 respectively and on the boss 28 a corresponding flat abutment face 31 is formed, said surfaces being erect relative to the base surface of the bearing plate 21 as shown in FIG. 3. The mutually inclined bearing surfaces 29 and 30 together form a V bearing structure.

At the center of the inner surface of the objective carrying shell 17 is formed an upstanding boss 32 as best shown in FIGS. 1 and 2 on which is formed a cylindrical smooth bearing surface 33 which is firmly seated against the erect flat bearing surfaces 29 and 30, the surface 33 cooperating with the surfaces 29 and 30 solely to provide an abutment means which is a part of the centralizing mechanism for the nosepiece. The safety abutment lug 28 is so positioned that it normally clears the cylindrical bearing surface 33 but acts inter alia as a guide in the assembly operation, and prevents bending of spring 38 during rough handling of the assembly. The above-described bearing surface 33 may be identified as the "first bearing means."

The construction of the aforesaid stud or bolt 20 includes a retaining flange 34, shown in FIG. 6, which overhangs a lateral surface 35 formed on the nosepiece shell 17 to prevent excessive separation between shell 17 and bearing plate 21 during rough handling of the assembly. A bore 36 is formed in the bearing boss 32 having ample clearance from the bolt or stud 20 to allow lateral relative movement therebetween when adjusting the centration of the objective 15. A shoulder 37 formed on stud 20 is located far enough from the flange 34 to guarantee some longitudinal freedom of movement of the boss 32 for a purpose mentioned hereinafter, as shown in FIG. 6.

As above mentioned, the bearing surface 33 is forced firmly against the two bearing surfaces 29 and 30 yieldably by a detent spring 38 as best shown in FIGS. 1 and 5, said spring being anchored at one end onto the casing 10. The free end of the spring 38 holds a detent ball 39 which engages forcibly in a notch 40 formed in the peripheral part of the nosepiece shell 17 to force the above-described bearing surfaces together as best shown in FIG. 2.

To assure that the nosepiece shell 17 rotates in a single plane without irregular movements or wobble, "second bearing means" are provided comprising a smooth planar bearing surface 41 which is yieldably urged against three strictly coplanar bearing surfaces 42, 43 and 44 formed on three protuberant corresponding pads integrally with bearing plate 21 as shown best in FIGS. 2 and 3.

The yieldable force which holds the ring surface 41 in firm contact with the bearing pad surfaces 42, 43 and 44 is supplied by a compression spring 45 which is housed in a counterbore 36 formed in the boss 32 as shown in FIGS. 1 and 6 whereby true coaxiality of the axis of the objective 15 with the axis 13 is established or at least said axes are reliably parallel to each other and may be brought into coincidence by shifting of the plate 21. It is strictly necessary that the angle between the inclined face 47 of cross wall 11 and optical axis 13 be equal to the angle formed between the plane of the surface 41 and the axis of the objective 15.

With reference to FIG. 4, the mechanism there shown is intended to greatly diminish the pressure of the spring 38 when the nosepiece shell 17 is rotated between any of its locking positions and to considerably increase said pressure when the ball 37 is engaged with notch 40. For that purpose a double ramp 48 is provided at each locking position peripherally thereof, each ramp portion being symmetrically formed at either side of said notch 40. It will be seen in FIGS. 2 and 6 how the added stressing of the detent spring 38 is accomplished as it is forced outwardly by the ball 39 as it rides up the ramp portion 48 inducing added pressure between the bearing surface 33 and the bearing or seating surfaces 29 and 30 for firmly and yieldably engaging these bearing surfaces as well as supplying an increased detent pressure on said ball.

One of the very advantageous features relates to the stiffening means for the bearing plate 21 whereby its stiffness and flatness is maintained reliably. As best shown in FIG. 3 of the drawings, three self-rigid and thick circular walls 49, 50 and 51 are integrally formed on the bearing plate 21 in the areas between the individual pad surfaces 44, 43 and 42 and the nearby bearing lugs 26, 27 and safety lug 28. It will be observed that the circular walls 49, 50, 51 are located in the areas of normally greatest flexure of the plate 21 and are joined to the respective lugs 26, 27, 28, each circular wall being centered on one of the three clearance holes 25 as shown in FIG. 2.

The circular walls 49, 50, 51 not only act as a plate stiffener but also are joined to the adjacent upstanding bearing bosses which carry the contact surfaces 29, 30 and 31 so that the rigidity and strength of the bosses is improved, as best shown in FIGS. 2 and 3.

It should be emphasized that there are several peculiar advantages resulting from the above-described unitary construction having the first bearing means 29, 30, 31 and second bearing means 42, 43, 44 integrally formed on a unitary plate 21 so that for all adjusting movements thereof, the mutual spatial relationships of the above-numbered means are still preserved. Such an arrangement achieves compactness and reliability of the bearing mechanism to a marked degree.

Although only certain forms of the present invention are shown and described in detail, other forms are possible and changes may be made in the arrangements and combinations of parts and in the detailed structures without departing from the spirit of this invention.

We claim:

1. Mounting mechanism for holding a rotatable nosepiece on the lower end of the tube of a microscope, said mechanism comprising:
    an end wall extending across the lower end of the tube of the microscope, the wall having an aperture therein in alignment with the optical axis of the microscope,
    a bearing plate fixed to said wall, said plate having means defining a central aperture,
    a group of three downwardly projecting lugs formed on said plate at substantially equi-angularly spaced relationship to each other around said aperture,
    a smooth erect contact surface formed on each lug in confronting relation to each other in the direction of a tangent to said aperture,
    an objective holding circular nosepiece shell having a smooth radial circular bearing surface formed near its outer rim,
    a retainer stud extending through said aperture and secured in said wall, and means cooperatively constructed between and on said stud and shell for resiliently urging the shell toward the wall,
    a cylindrical thimble secured centrally in said shell and nominally concentric with and free of said stud,
    a smooth cylindrical outer surface formed on said thimble which is smaller than said aperture and which bears against two of said downwardly projecting lugs,
    spring detent means fixed to said wall and projecting into operative engagement with the rim of said shell to oppose relative rotation, the angular position of said means being radially aligned with the third of said downwardly projecting lugs, and
    a set of three flat pads which are coplanar and are equi-angular formed in engaging position with said smooth radial circular bearing surface,
    whereby said pads establish a true plane in which the shell may rotate and furthermore two of the erect contact surfaces define a location for the center of rotation for said shell, 2. Mounting mechanism for holding a rotatable nosepiece on the lower end of the tube of a microscope, said mechanism comprising:
    an end wall extending across the lower end of the tube of the microscope, the wall having an aperture therein in alignment with the optical axis of the microscope,
    a bearing plate fixed to said wall, said plate having means defining a central aperture,
    a group of three downwardly projecting lugs formed on said plate at substantially equi-angularly spaced relationship to each other around said aperture,
    a smooth erect contact surface formed on each lug in confronting relation to each other in the direction of a tangent to said aperture,
    an objective holding circular nosepiece shell having a smooth radial circular bearing surface formed near its outer rim,
    a retainer stud extending through said aperture and secured in said wall, and means cooperatively constructed between and on said stud and shell for resiliently urging the shell toward the wall,
    a cylindrical thimble secured centrally in said shell and nominally concentric with and free of said stud, a smooth cylindrical outer surface formed on said thimble which is smaller than said aperture and which bears against two of said downwardly projecting lugs, a spring detent carried by the lower part of said tube in yieldable contact radially with the peripheral surface of said circular nosepiece shell, a raised local ramp surface formed radially outwardly at every operating station on said nosepiece shell in position to be engaged by said detent to increase the pressure thereof, the high point of the ramp surface having means forming an indented detent notch wherein said detent engages, the spring detent further being located in radial alignment with one of said contact surfaces whereby the detent causes said thimble to be seated against the other two contact surfaces.

3. Mounting mechanism for holding a rotatable nosepiece on a microscope as set forth in claim 2, said mechanism further being characterized by:

said other two contact surfaces at least being formed flat at a radial position slightly less than the radius of said aperture whereby a smooth rotation of the thimble thereon is effected.

4. Mounting mechanism for securing a rotatable nosepiece on the lower end of the tube of the microscope, and mechanism comprising:

an end wall having a flat surface formed obliquely across said end of the tube, means forming a vertical opening through said wall in alignment with the optical axis of said microscope, a substantially flat bearing plate secured against said flat surface, said plate having a reentrant opening formed in one side in registry with said vertical opening so as to expose said opening, a rotatable nosepiece shell whereon a plurality of objectives are mounted, a hollow thimble having a round outer surface formed thereon, said thimble projecting centrally inwardly of the shell, a V bearing structure including a pair of mutually spaced upstanding lugs formed on said plate, said V structure being provided by a pair of relatively inclined flat surfaces formed individually on said lugs whereon said round outer surface engages, spring detent means anchored on said wall in such a position as to bear under spring stress against the outer rim of said shell at a point opposite to said lugs and force the thimble against the inclined flat surfaces, a smooth radial annular surface formed adjacent to the rim on said shell, three coplanar flat pads formed on said plates at substantially equally spaced distance from each other in engaging alignment with said radial annular surface whereby axial alignment of the successive objectives is assured while in operative position, and means for swivelly holding said shell against said pads 5. Mounting mechanism for holding a rotatable nosepiece on the lower end of the tube of a microscope, said mechanism comprising:

a substantially flat end wall formed across the lower end of said tube, the wall having an aperture therein in alignment with the optical axis of the microscope, a bearing plate fitted to contact said end wall in at least three substantially equally spaced areas thereon, clamping means extending through clearance holes at each said area on said plate and operatively constructed to secure the plate to the wall, a stiffening wall circularly formed around said clamping means on said plate at each said area to oppose distortion of the plate while under clamping stress, a V bearing structure including a pair of mutually spaced upstanding lugs formed integrally on said plate and on two of said stiffening walls, said structure including a pair of flat relatively inclined bearing surfaces formed individually on said lugs so that stiffening walls support said inclined bearing surfaces in addition to maintaining flatness of said plate, a cylindrical thimble fixed centrally to said rotatable nosepiece and projecting into operative contact with said inclined bearing surfaces to establish trans axis alignment of the nosepiece with said tube, a radial annular bearing surface formed continuously around the peripheral portion of said nosepiece, a trio of flat bearing pads formed on said plate mutually coplanar and substantially equally spaced, one pad being adjacent to one of said areas in engagement with said annular bearing surface, and means for biasing the annular bearing surface toward said flat bearing pads, whereby said pads are maintained coplanar after clamping stress is applied to said plate.

References Cited

UNITED STATES PATENTS

| | | |
|---|---|---|
| 2,565,419 | 8/1951 | Aitcheson. |
| 905,633 | 11/1908 | Bausch _____ 350—254 |

DAVID SCHONBERG, Primary Examiner

A. OSTRAGER, Assistant Examiner

U.S. Cl. X.R.
350—39